(12) United States Patent
Xu et al.

(10) Patent No.: US 11,357,220 B2
(45) Date of Patent: Jun. 14, 2022

(54) DIP NET PROVIDED WITH LOCKABLE HOOPS CAPABLE OF BEING FOLDED LEFTWARDS AND RIGHTWARDS

(71) Applicant: HANGZHOU FUFAN INDUSTRY CO., LTD., Hangzhou (CN)

(72) Inventors: Hongjian Xu, Hangzhou (CN); Shu Lin, Hangzhou (CN); Linrong Hong, Hangzhou (CN); Huihai Ge, Hangzhou (CN); Xiong Li, Hangzhou (CN)

(73) Assignee: HANGZHOU FUFAN INDUSTRY CO., LTD., Hangzhou (CN)

( * ) Notice: Subject to any disclaimer, the term of this patent is extended or adjusted under 35 U.S.C. 154(b) by 296 days.

(21) Appl. No.: 16/453,535

(22) Filed: Jun. 26, 2019

(65) Prior Publication Data
US 2020/0359611 A1    Nov. 19, 2020

(30) Foreign Application Priority Data

May 17, 2019  (CN) .......................... 201910412311.1

(51) Int. Cl.
*A01K 77/00*  (2006.01)
*A01K 75/02*  (2006.01)

(52) U.S. Cl.
CPC .............. *A01K 77/00* (2013.01); *A01K 75/02* (2013.01)

(58) Field of Classification Search
CPC ...................................................... A01K 77/00
USPC ....................................................... 43/11, 12
See application file for complete search history.

(56) References Cited

U.S. PATENT DOCUMENTS

| 270,641 | A | * | 1/1883 | Dodge | A01K 77/00 43/12 |
| 273,279 | A | * | 3/1883 | Hosea | A01K 77/00 43/11 |
| 367,928 | A | * | 8/1887 | Reed | A01K 77/00 43/12 |
| 401,360 | A | * | 4/1889 | Marsters | A01K 77/00 43/12 |

(Continued)

FOREIGN PATENT DOCUMENTS

| AT | 409578 B * 9/2002 | A01K 77/00 |
| CA | 2310863 A1 * 12/2000 | A01K 77/00 |

(Continued)

OTHER PUBLICATIONS

Translation of JP 2010-11763A (Year: 2010).*

*Primary Examiner* — Darren W Ark
(74) *Attorney, Agent, or Firm* — Jiwen Chen; Jacobson Holman PLLC (57) ABSTRACT

A dip net provided with lockable hoops capable of being folded leftwards and rightwards comprises a net rod, a hoop mounting base mounted on the net rod, and hoops including a left hoop and a right hoop, wherein mounting plates are arranged on the left side and the right side of the hoop mounting base, and two rotary bases are arranged at the rear end of the left hoop and the rear end of the right hoop and are hinged to the mounting plates through rotary shafts. The left hoop and the right hoop can be folded and are independently connected to the hoop mounting base, so that assembly is convenient; and the size can be reduced for transportation and carrying, so that carrying storage are facilitated.

7 Claims, 12 Drawing Sheets

(56) References Cited

U.S. PATENT DOCUMENTS

| | | | | |
|---|---|---|---|---|
| 403,680 A * | 5/1889 | Landman | A01K 77/00 43/12 |
| 407,709 A * | 7/1889 | White | A01K 77/00 43/12 |
| 407,979 A * | 7/1889 | Wheeler | A01K 77/00 43/12 |
| 412,773 A * | 10/1889 | Meisselbach | A01K 77/00 43/12 |
| 440,568 A * | 11/1890 | Hebard | A01K 77/00 43/12 |
| 452,381 A * | 5/1891 | Meisselbach | A01K 77/00 43/12 |
| 479,157 A * | 7/1892 | Reed | A01K 77/00 43/12 |
| 520,567 A * | 5/1894 | Kamp | A01K 77/00 43/12 |
| 524,942 A * | 8/1894 | Holmes | A01K 77/00 43/12 |
| 525,619 A * | 9/1894 | Pearsons | A01K 77/00 43/12 |
| 546,023 A * | 9/1895 | Meisselbach | A01K 77/00 43/12 |
| 549,367 A * | 11/1895 | Keenan | A01K 77/00 43/12 |
| 549,368 A * | 11/1895 | Keenan | A01K 77/00 43/12 |
| 550,514 A * | 11/1895 | Larzelere | A01K 77/00 43/12 |
| 577,684 A * | 2/1897 | Holmes | A01K 77/00 43/12 |
| 649,581 A * | 5/1900 | Landman | A01K 77/00 43/12 |
| 708,797 A * | 9/1902 | Coffin | A01K 77/00 43/12 |
| 752,550 A * | 2/1904 | Heritage | A01K 77/00 43/12 |
| 815,144 A * | 3/1906 | Carlton | A01K 77/00 43/12 |
| 823,113 A * | 6/1906 | French et al. | A01K 77/00 43/12 |
| 956,803 A * | 5/1910 | Fromm | A01K 77/00 43/12 |
| 959,555 A * | 5/1910 | Koberstein | A01K 77/00 43/12 |
| 996,234 A * | 6/1911 | Fritz | A01K 77/00 43/12 |
| 1,077,481 A * | 11/1913 | Levy | A01K 77/00 43/12 |
| 1,088,766 A * | 3/1914 | Borgardt | A01K 77/00 43/12 |
| 1,169,311 A * | 1/1916 | Walter | A01K 77/00 43/12 |
| 1,172,056 A * | 2/1916 | Schenfield | A01K 77/00 43/12 |
| 1,340,874 A * | 5/1920 | Brown | A01K 77/00 43/12 |
| 1,366,145 A * | 1/1921 | Wolf | A01K 77/00 43/12 |
| 1,387,393 A * | 8/1921 | Hanel | A01K 77/00 43/12 |
| 1,430,221 A * | 9/1922 | Dukas | A01K 77/00 43/12 |
| 1,450,322 A * | 4/1923 | Mcelhany | A01K 77/00 43/12 |
| 1,513,990 A * | 11/1924 | Higginbotham | A01K 77/00 43/12 |
| 1,524,957 A * | 2/1925 | Sundberg | A01K 77/00 43/12 |
| 1,546,502 A * | 7/1925 | Maschmann | A01K 77/00 43/12 |
| 1,835,197 A * | 12/1931 | Young | A01K 77/00 43/12 |
| 1,886,559 A * | 11/1932 | Larzelere | A01K 77/00 43/12 |
| 2,040,714 A * | 5/1936 | Smith | A01K 77/00 43/12 |
| 2,202,789 A * | 5/1940 | Benson | A01K 77/00 43/12 |
| 2,205,229 A * | 6/1940 | Spriggs | A01K 77/00 43/12 |
| 2,354,942 A * | 8/1944 | Chapman | A01K 77/00 43/12 |
| 2,420,087 A * | 5/1947 | Meek | A01K 77/00 43/17.5 |
| 2,491,703 A * | 12/1949 | Bell | A01K 77/00 43/12 |
| 2,515,685 A * | 7/1950 | Ash | A01K 77/00 43/12 |
| 2,556,650 A * | 6/1951 | Hicks | A01K 77/00 43/12 |
| 2,561,645 A * | 7/1951 | Bedford | A01K 77/00 43/12 |
| 2,579,748 A * | 12/1951 | Matthews | A01K 77/00 43/12 |
| 2,595,597 A * | 5/1952 | Morseth | A01K 77/00 285/302 |
| 2,645,874 A * | 7/1953 | Collins | A01K 77/00 43/12 |
| 2,653,403 A * | 9/1953 | Oslund | A01K 77/00 43/11 |
| 2,653,404 A * | 9/1953 | Phaneuf | A01K 77/00 43/12 |
| 2,683,321 A * | 7/1954 | Faber | A01K 77/00 43/12 |
| 2,725,657 A * | 12/1955 | Wiederhold | A01K 77/00 43/12 |
| 2,725,658 A * | 12/1955 | Wiederhold | A01K 77/00 43/12 |
| 2,791,676 A * | 5/1957 | Cote | A01K 87/08 362/119 |
| 2,817,175 A * | 12/1957 | Morris | A01K 77/00 43/11 |
| 3,077,693 A * | 2/1963 | Wallin | A01K 77/00 43/17.5 |
| 3,318,035 A * | 5/1967 | Hovland | A01K 77/00 43/12 |
| 4,138,790 A * | 2/1979 | Schmucker | A01K 77/00 43/12 |
| 4,207,700 A * | 6/1980 | Marleau | A01K 77/00 43/12 |
| 4,619,065 A * | 10/1986 | Jones | A01K 97/24 43/11 |
| 4,800,667 A * | 1/1989 | Johnson | A01K 77/00 43/17.5 |
| 4,815,227 A * | 3/1989 | Flanders, Sr. | A01K 77/00 43/11 |
| 4,870,773 A * | 10/1989 | Schmucker | A01K 77/00 43/12 |
| 5,157,854 A * | 10/1992 | Rumsey, Jr. | A01K 77/00 43/12 |
| 5,339,556 A * | 8/1994 | Boehm | A01K 77/00 43/11 |
| 5,380,113 A * | 1/1995 | Boehm | A01K 77/00 16/319 |
| 5,471,778 A * | 12/1995 | Marfori | A01K 77/00 43/12 |
| 5,941,011 A * | 8/1999 | Baker | A01K 77/00 43/12 |
| 6,101,756 A * | 8/2000 | Baker | A01K 77/00 43/12 |
| 6,260,302 B1 * | 7/2001 | Blaschke | A01K 77/00 43/12 |
| 6,408,560 B1 * | 6/2002 | Bloom | A01K 77/00 403/109.3 |
| 6,796,075 B2 * | 9/2004 | Maguire | A01K 77/00 43/12 |
| 6,908,216 B2 * | 6/2005 | Love | A01K 77/00 43/17.5 |

(56) References Cited

U.S. PATENT DOCUMENTS

| | | | | |
|---|---|---|---|---|
| 7,124,533 | B2 * | 10/2006 | Kleckner | A01K 77/00 43/11 |
| 7,624,530 | B2 * | 12/2009 | Resch | A01K 77/00 43/17.5 |
| 8,490,318 | B2 * | 7/2013 | Smith | A01K 77/00 43/12 |
| 8,516,737 | B2 * | 8/2013 | Hume | A01K 77/00 43/11 |
| 8,806,801 | B2 * | 8/2014 | Steffens | A01K 77/00 43/12 |
| 10,334,831 | B2 * | 7/2019 | Kudner | A01K 77/00 |
| 10,717,183 | B1 * | 7/2020 | LaHood | B25G 1/04 |
| 2005/0024872 | A1 * | 2/2005 | Love | A01K 77/00 362/253 |
| 2005/0091905 | A1 * | 5/2005 | Larson | A01K 77/00 43/17.5 |
| 2019/0053475 | A1 * | 2/2019 | Xu | A01K 74/00 |
| 2020/0163317 | A1 * | 5/2020 | Xu | A01K 77/00 |
| 2021/0007337 | A1 * | 1/2021 | He | A01K 77/00 |

FOREIGN PATENT DOCUMENTS

| | | | | |
|---|---|---|---|---|
| CA | 2762699 | A1 * | 7/2012 | A01K 77/00 |
| CA | 2762699 | C * | 7/2017 | A01K 77/00 |
| CH | 299953 | A * | 7/1954 | A01K 77/00 |
| CH | 470133 | A * | 3/1969 | A01K 77/00 |
| DE | 814680 | C * | 9/1951 | A01K 77/00 |
| DE | 9207528 | U1 * | 8/1992 | A01K 77/00 |
| DE | 9410167 | U1 * | 8/1994 | A01K 77/00 |
| DE | 19928932 | A1 * | 2/2000 | A01K 77/00 |
| EP | 0706316 | B1 * | 8/1997 | A01K 77/00 |
| FR | 982477 | A * | 6/1951 | A01K 77/00 |
| FR | 1335230 | A * | 8/1963 | A01K 77/00 |
| FR | 2042160 | A5 * | 2/1971 | A01K 77/00 |
| FR | 2493675 | A3 * | 5/1982 | A01K 77/00 |
| FR | 2515482 | A1 * | 5/1983 | A01K 77/00 |
| FR | 2559644 | A3 * | 8/1985 | A01K 77/00 |
| FR | 3048583 | A1 * | 9/2017 | A01K 77/00 |
| GB | 990911 | A * | 5/1965 | A01K 77/00 |
| GB | 990912 | A * | 5/1965 | A01K 77/00 |
| GB | 1040338 | A * | 8/1966 | A01K 77/00 |
| GB | 1521634 | A * | 8/1978 | A01K 77/00 |
| GB | 2005971 | B * | 1/1982 | A01K 77/00 |
| GB | 2192321 | A * | 1/1988 | A01K 77/00 |
| GB | 2253982 | A * | 9/1992 | A01K 77/00 |
| GB | 2279219 | A * | 1/1995 | |
| JP | H0611463 | U * | 2/1994 | |
| JP | 7019259 | Y2 * | 5/1995 | |
| JP | 3016197 | B2 * | 3/2000 | |
| JP | 3085105 | B2 * | 9/2000 | |
| JP | 2002142612 | A * | 5/2002 | |
| JP | 2002186398 | A * | 7/2002 | |
| JP | 2002223687 | A * | 8/2002 | |
| JP | 2003304779 | A * | 10/2003 | |
| JP | 2004049191 | A * | 2/2004 | |
| JP | 3798518 | B2 * | 7/2006 | |
| JP | 3798803 | B1 * | 7/2006 | |
| JP | 2007028952 | A * | 2/2007 | |
| JP | 2007274961 | A * | 10/2007 | |
| JP | 2010011763 | A * | 1/2010 | |
| JP | 4638595 | B2 * | 2/2011 | |
| JP | 4728863 | B2 * | 7/2011 | |
| JP | 4763814 | B2 * | 8/2011 | A01K 77/00 |
| JP | 2011205928 | A * | 10/2011 | |
| JP | 4875667 | B2 * | 2/2012 | |
| JP | 2021000011 | A * | 1/2021 | |
| KR | 20020036653 | A * | 5/2002 | |
| KR | 20020072861 | A * | 9/2002 | |
| KR | 20100028850 | A * | 3/2010 | |
| KR | 20130131188 | A * | 12/2013 | |
| KR | 101373632 | B1 * | 3/2014 | |
| KR | 101417262 | B1 * | 7/2014 | |
| SU | 731939 | A1 * | 5/1980 | |
| SU | 1299555 | A1 * | 3/1987 | |
| WO | WO-8501859 | A1 * | 5/1985 | A01K 77/00 |
| WO | WO-9407362 | A1 * | 4/1994 | A01K 77/00 |
| WO | WO-9500013 | A1 * | 1/1995 | A01K 77/00 |
| WO | WO-0065958 | A1 * | 11/2000 | A01K 77/00 |
| WO | WO-2015065932 | A2 * | 5/2015 | A01K 77/00 |

* cited by examiner

DIP NET PROVIDED WITH LOCKABLE HOOPS CAPABLE OF BEING FOLDED LEFTWARDS AND RIGHTWARDS

This application claims the priority benefit of Chinese Application No. 2019104123111, filed May 17, 2019, which is hereby incorporated by reference.

BACKGROUND OF THE INVENTION

1. Technical Field

The present invention relates to the field of fishing tackle, in particular to a dip net provided with lockable hoops capable of being folded leftwards and rightwards.

2. Description of Related Art

In the fishing process, it is an indispensable step to scoop fish with dip nets. Particularly when big fish are caught, it will be difficult to get the big fish onto the bank without dip nets, and the fish can even escape, which makes all previous labor in vain. For this reason, dip nets are indispensable fishing tackle, of which the structure and quality are particularly important for fishing. Existing dip nets on the market have various defects. For instance, these dip nets have to be assembled on site when used, which will spend a lot of time and labor. In addition, these dip nets are large in size and poor in bearing capacity and are provided with long rods, thereby being inconvenient to carry.

Chinese Patent Application No. 201320072345.9 discloses a extendable-retractable escape-proof long-handle dip net which is used to scoop fish from a distance, capable of being retracted for transportation, and omits the procedure of field assembly for lengthening the net rod. The extendable-retractable escape-proof long-handle dip net is composed of an extendable-retractable handle, a hoop and a net mesh, wherein the extendable-retractable handle (namely the net rod) is of an extendable-retractable structure and can be extended when used and be retreated when carried and transported, so that the trouble of field assembly is avoided.

However, the hoop in the above patent is unfoldable and has a large size in the transportation process, thereby being inconvenient to transport by fishermen and resulting in a higher cost to producers. To solve these problems, Chinese Patent Application No. 201721024419.6 discloses a dip net capable of being folded inwards. The dip net capable of being folded inwards comprises a hoop connector, a handle, a main folding frame, a net tube and a lock structure, wherein the main folding frame comprises a first main folding frame part and a second main folding frame part, and the lock structure is connected with the handle. The main folding frame further comprises a directional shaft sleeve fixed in the first main folding frame part and sleeved with the second main folding frame part, the second main folding frame part is rotatably mounted on the directional shaft sleeve, and the handle is mounted in the directional shaft sleeve; the second main folding frame part is provided with a main frame hole, and the directional shaft sleeve is provided with a directional hole; when a first net tube and a second net tube are completely extended, the main frame hole is aligned to the directional hole; and when clamped in the main frame hole and the directional hole, the lock structure restrains the handle, the second main folding frame part and the first main folding frame part from moving. The size of the dip net in this patent can be greatly reduced for storage and transportation.

According to the dip net disclosed in this above patent, the first main folding frame part is provided with the directional shaft sleeve and is rotatably connected with the handle through the directional shaft sleeve, and the second main folding frame part is rotatably arranged on the directional shaft sleeve, so that the first main folding frame part and the second main folding frame part are correlated with each other. When the dip net is produced and assembled, the first main folding frame part needs to be rotated inside first, then the second main folding frame part is assembled, and the whole assembly process is complex; the first main folding frame part and the second main folding frame part may be affected by each other when rotating, and when one main folding frame part is rotated, the other one may be driven to rotate synchronously, so that the two main folding frame part cannot be positioned easily; and when one main folding frame part is broken and needs to be replaced, both main folding frames parts have to be disassembled, and then both main folding frame parts have to be assembled after replacement, so that replacement and maintenance are cumbersome.

BRIEF SUMMARY OF THE INVENTION

The object of the present invention is to overcome the defects of the prior art by providing a dip net, which is provided with lockable hoops capable of being folded leftwards and rightwards and is convenient to assemble.

For the sake of a brief description of this application, the applicant omits 'string bag' in the following text description, and the string bag is not shown in the figures either. Those skilled in this field would appreciate that the string bag should be attached to or mounted on the net rack when the dip net in this patent is used.

The technical solution provided by the present invention to fulfill the above object is as follows:

The present invention relates to a dip net provided with lockable hoops capable of being folded leftwards and rightwards. The dip net comprises a net rod, a hoop mounting base and hoops, wherein the hoops include a left hoop and a right hoop, the hoop mounting base is mounted on the net rod, and mounting plates are arranged on the left side and the right side of the hoop mounting base; rotary bases are arranged at the rear end of the left hoop and the rear end of the right hoop, and the two rotary bases are respectively hinged to the mounting plates on the two sides through rotary shafts; a first connecting plate and a second connecting plate are respectively arranged at the front end of the left hoop and the front end of the right hoop and are hinged together; and a lock device is arranged on the hoop mounting base and is used for locking the left hoop and the right hoop on the hoop mounting base when the left hoop and the right hoop are rotated to the same plane.

Preferably, the lock device comprises a lock piece, a stop block, springs and pins, wherein the stop block is fixed to the rear side of the hoop mounting base, a sliding area is formed between the stop block and the hoop mounting base, the lock piece is mounted in the sliding area and is slidably connected with the hoop mounting base, the pins are fixed to the front end of the lock piece, the springs are mounted in front of the stop block, the front ends of the springs are in close contact with the lock piece, and the rear ends of the springs are in close contact with the stop block; and pin holes are formed in the rear sides of the rotary bases, and the pin holes are staggered with the rotary shafts and are matched with the corresponding pins.

Preferably, the lock piece comprises a front lantern ring, a rear lantern ring and an intermediate barrier plate, wherein the front lantern ring is disposed around the hoop mounting base, the rear lantern ring is disposed around the stop block, the intermediate barrier plate is located in the sliding area, the front ends of the springs are in close contact with the rear side face of the intermediate barrier plate, the intermediate barrier plate is provided with a net rod hole and a screw rod hole, the stop block is fixed on the hoop mounting base through a screw rod, the screw rod penetrates through the screw rod hole, and the net rod penetrates through the net rod hole. The lock piece, the hoop mounting base and the stop block are combined into a whole, so that the structure is stable, one person can slide the lock piece with a single hand, and thus, the hoops can be folded easily.

Preferably, spring limit screws corresponding to the springs are arranged on the front side of the stop block and have a diameter matched with an inner diameter of the springs, and the rear half portions of the springs are disposed around the spring limit screws. The spring limit screws can prevent the springs from skewing in use.

Preferably, the hoop mounting base is provided with a through hole and a first lock mechanism, wherein the first lock mechanism comprises a first lock catch hinged to the hoop mounting base, and the first lock catch is provided with a first reset spring and a first protrusion which are respectively located on the front side and the rear side of a hinge joint; and the net rod penetrates through the through hole, and a first lock hole is formed in the front end of the net rod and is matched with the first protrusion. When the dip net is transported, the net rod can retreat into the area defined by the left hoop and the right hoop, so that the length of the dip net is decreased in the transportation process. When the dip net is used, the net rod is locked by the first lock mechanism and is retrained from retreating, so that normal usage of the dip net is guaranteed.

Preferably, the net rod comprises a front net rod part and a rear net rod part, wherein a front handheld part is arranged at the rear end of the front net rod part and is provided with a second lock mechanism, the second lock mechanism comprises a second lock catch hinged to the front handheld part, and the second lock catch is provided with a second reset spring and a second protrusion which are respectively located on the front side and the rear side of a hinge point; and the rear net rod part has a rear end provided with a rear handheld part, is slidably connected with the front net rod part, and has a front end provided with a second lock hole, a third lock hole is formed in the rear end of the rear net rod part, and the second protrusion is matched with the second lock hole or the third lock hole. The net rod is divided into the front net rod part and the rear net rod part, is locked by the second lock mechanism, and can be stretched or retreated according to the distance to fish to be scooped, and thus, the dip net is suitable for scooping fish within various distances.

Preferably, a cavity is formed in the front portion of the net rod, a flash light is arranged in the cavity, and an elastic touch switch is arranged at the rear end of the flash light and makes contact with the rear end face of the cavity; and a cover plate is arranged at the front end of the net rod and is connected with the net rod in a threaded manner, and a button is arranged at the center of the cover plate and is matched with the flash light. The flash light can be turned on at night to facilitate fishing and can emit light to attract fish.

Preferably, the surface of the front handheld part and the surface of the rear handheld part are each provided with a plurality of anti-slip grooves. The anti-slip grooves are used for increasing the friction between the hand and the net rod, so that a better sense of touch is realized, and the dip net is unlikely to slip out of the hand.

Compared with the prior art, the technical solution adopted by invention has the following beneficial effects:

1. According to the dip net provided with the lockable hoops capable of being folded leftwards and rightwards, the left hoop and the right hoop are foldable and can be folded to reduce the size during storage and transportation, so that the dip net can be conveniently stored and carried by users and can greatly reduce transportation and storage costs for manufacturers.

2. The left hoop and the right hoop have the rear ends connected to the hoop mounting base, so that mutual interference between the left hoop and the right hoop is avoided, and assembly is made easy; the left hoop and the right hoop can rotate without being affected by each other, so that the unfolding or folding angle of the left hoop and the right hoop can be controlled more easily; when either the left hoop or the right hoop is broken, only the broken one needs to be replaced, so that the maintenance cost is reduced; and the left hoop and the right hoop are independently connected to the hoop mounting base, so that when the broken hoop is disassembled to be replaced, the influence on the other hoop can be reduced, and disassembly and reassembly are facilitated.

3. The net rod is of an extendable-retractable structure, suitable for scooping fish nearby as well as fish from a distance; and meanwhile, the overall length of the net rod can be reduced for transportation and storage, so that the net rod can be carried conveniently, and the transportation cost is reduced.

REFERENCE SIGNS 1, net rod; 2, hoop mounting base; 3, left hoop; 4, right hoop; 11, first lock hole; 12, front net rod; 13, rear net rod; 14, front handle; 15, rear handle; 16, second lock mechanism; 17, second lock hole; 18, third lock hole; 19, flash light; 20, cover plate; 22, lock piece; 23, stop block; 24, mounting plate; 25, pin; 26, spring; 27, first lock mechanism; 31, rotary base; 32, pin hole; 33, first connecting plate; 40, rotary pin; 41, second connecting plate; 161, second lock catch; 162, second reset spring; 163, second protrusion; 221, front lantern ring; 222, intermediate barrier plate; 223, rear lantern ring; 224, net rod hole; 225, screw rod hole; 231, spring limit screw; 271, first lock catch; 272, first reset spring; 273, first protrusion.

DETAILED DESCRIPTION OF THE INVENTION

For a better understanding of the invention, the invention is expounded below with reference to the embodiments. The following embodiments are used to explain the invention, but are not intended to limit the scope of the invention. In this embodiment, a side, pointing to the hoops, of the net rod is defined as the front side, and a side, backing onto the hoops, of the net rod is defined as the rear side.

Figure 1:
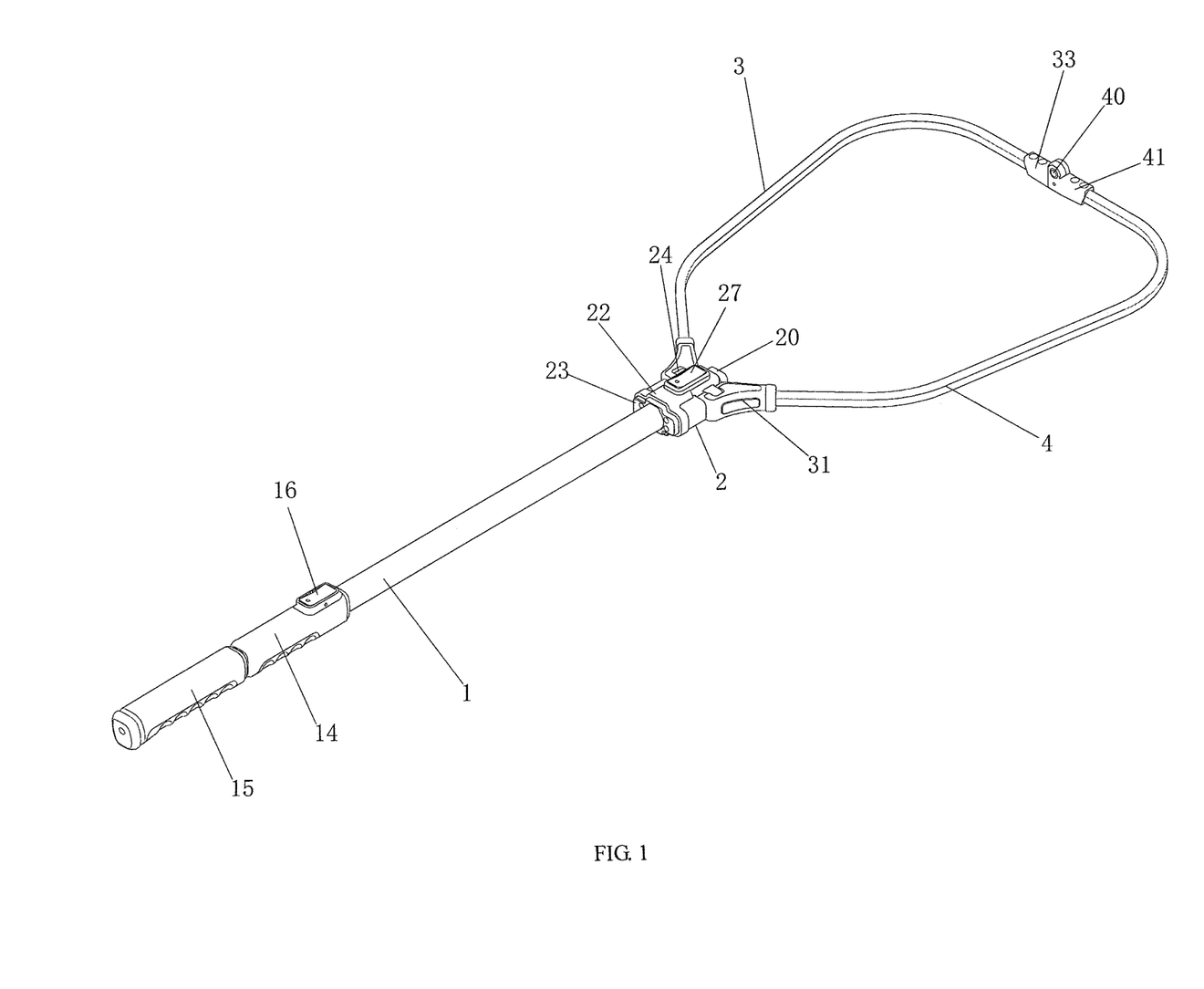
FIG. 1 is a structure view of a dip net provided with lockable hoops capable of being folded leftwards and rightwards.
Figure 2:
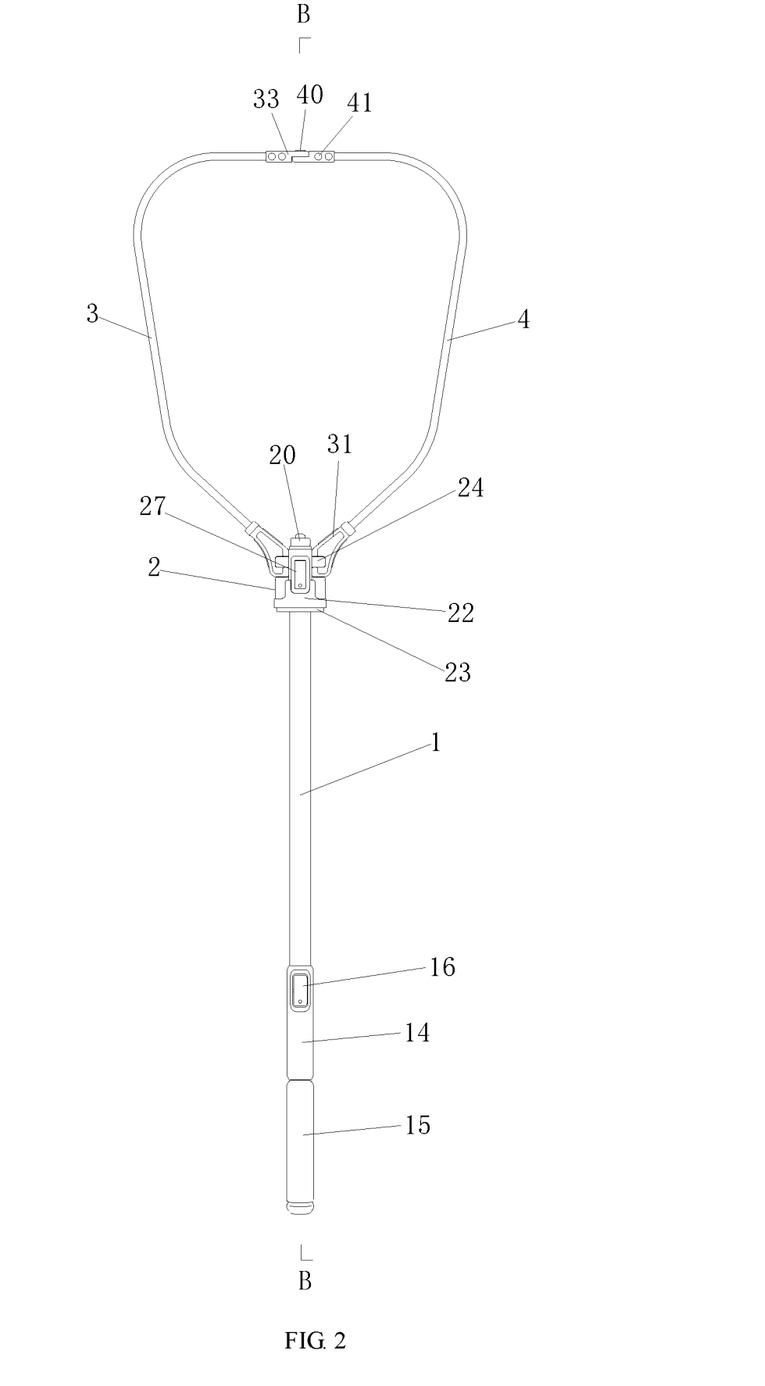
FIG. 2 is a front view of the dip net provided with the lockable hoops capable of being folded leftwards and rightwards.
Figure 3:
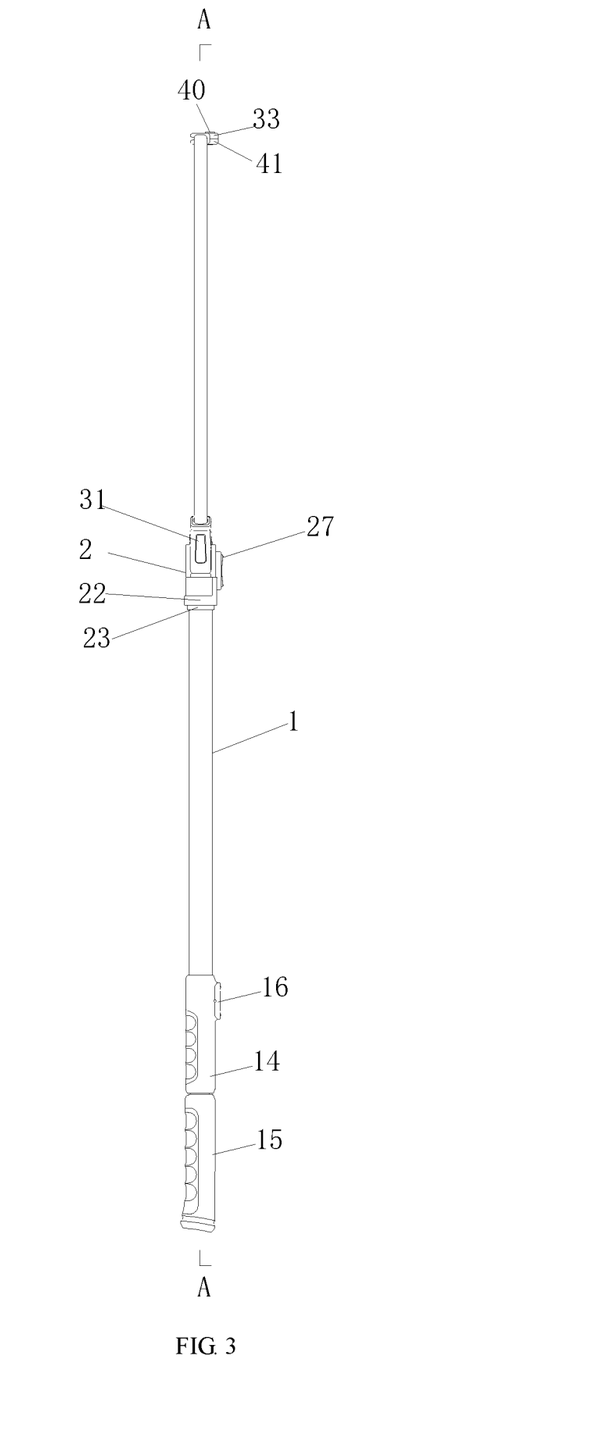
FIG. 3 is a side view of the dip net provided with the lockable hoops capable of being folded leftwards and rightwards.

As shown in FIGS. 1-3, the present invention relates to a dip net provided with lockable hoops capable of being folded leftwards and rightwards. The dip net comprises a net rod 1, a hoop mounting base 2, a left hoop 3 and a right hoop 4.

As shown in FIGS. 4-8, the hoop mounting base 2 is provided with a lock device, a through hole and a first lock mechanism 27, wherein the first lock mechanism 27 comprises a first lock catch 271 hinged to the hoop mounting base 2, and the lock catch 271 is provided with a first reset spring 272 and a first protrusion 273 which are respectively located on the front side and the rear side of a hinge joint; the hoop mounting base 2 is arranged on the net rod 1, and the net rod 1 penetrates through the through hole in the hoop mounting base 2; and a first lock hole 11 is formed in the front end of the net rod 1 and is matched with the first protrusion 273. A cavity is formed in the front portion of the net rod 1, a flash light 19 is arranged in the cavity, and an elastic touch switch is arranged at the rear end of the flash light 19 and makes contact with the rear end face of the cavity. A cover plate 20 is arranged at the front end of the net rod 1 and is connected with the net rod 1 in a threaded manner. A button is arranged at the center of the cover plate 20 and is matched with the flash light 19. If the button is pressed to enable the flash light 19 to move backwards, the elastic touch switch is pressed to turn on the flash light 19; and if the button is pressed again to enable the flash light 19 to move backwards, the elastic touch switch is pressed again to turn off the flash light 19. The flash light can be turned on at night to facilitate fishing and can emit light to attract fish.

When the dip net is transported or stored, the net rod 1 can retreat into an area defined by the left hoop 3 and the right hoop 4, so as to decrease the length of the dip net. When the dip net is used, the net rod 1 is pulled out; when the first lock hole 11 and the first protrusion 273 are aligned in position, the first reset spring 272 applies a force to the front half portion of the first lock catch 271, so that the first lock catch 271 rotates, the first protrusion 273 is inserted into the first lock hole 11, and accordingly, the net rod 1 is locked by the first lock mechanism 27 and is restrained from retreating to keep the dip net in the usage state.

As shown in FIGS. 4-8, the net rod 1 comprises a front net rod part 12 and a rear net rod part 13, wherein a front handheld part 14 is arranged at the rear end of the front net rod part 12 and is provided with a second lock mechanism 16; the second lock mechanism 16 comprises a second lock catch 161 hinged to the front handheld part 14, and the second lock catch 161 is provided with a second reset spring 162 and a second protrusion 163 which are respectively located on the front side and the rear side of a hinge joint; a rear handheld part 15 is arranged at the rear end of the rear net rod part 13, a second lock hole 17 is formed in the front end of the rear net rod part 13, a third lock hole 18 is formed in the rear end of the rear net rod part 13; and the rear net rod part 13 is slidably connected with the front net rod part 12 and can stretch or retreat to change the overall length of the net rod 1. The surface of the front handheld part 14 and the surface of the rear handheld part 15 are each provided with a plurality of anti-slip grooves used for increasing the friction between the hand and the net rod, so that a better sense of touch is realized, and the dip net is unlikely to slip out of the hand.

When the dip net is used for scooping fish nearby, the second protrusion 163 is matched with the third lock hole 18. When the dip net is used for scooping fish from a distance, the net rod 1 is stretched in the following way: the front half portion of the second lock catch 161 is pressed, while the rear half portion of the second lock catch 161 tilts upwards; the second protrusion 163 disengages from the third lock hole 18, then the rear net rod part 13 is pulled out, and the second lock catch 161 is released; and when the second lock hole 17 coincides with the second protrusion 163 in position while the rear net rod part 13 is pulled, the second reset spring 162 applies a force to the second lock catch 161, and then the second protrusion 163 is locked in the second lock hole 17.

Figure 4:
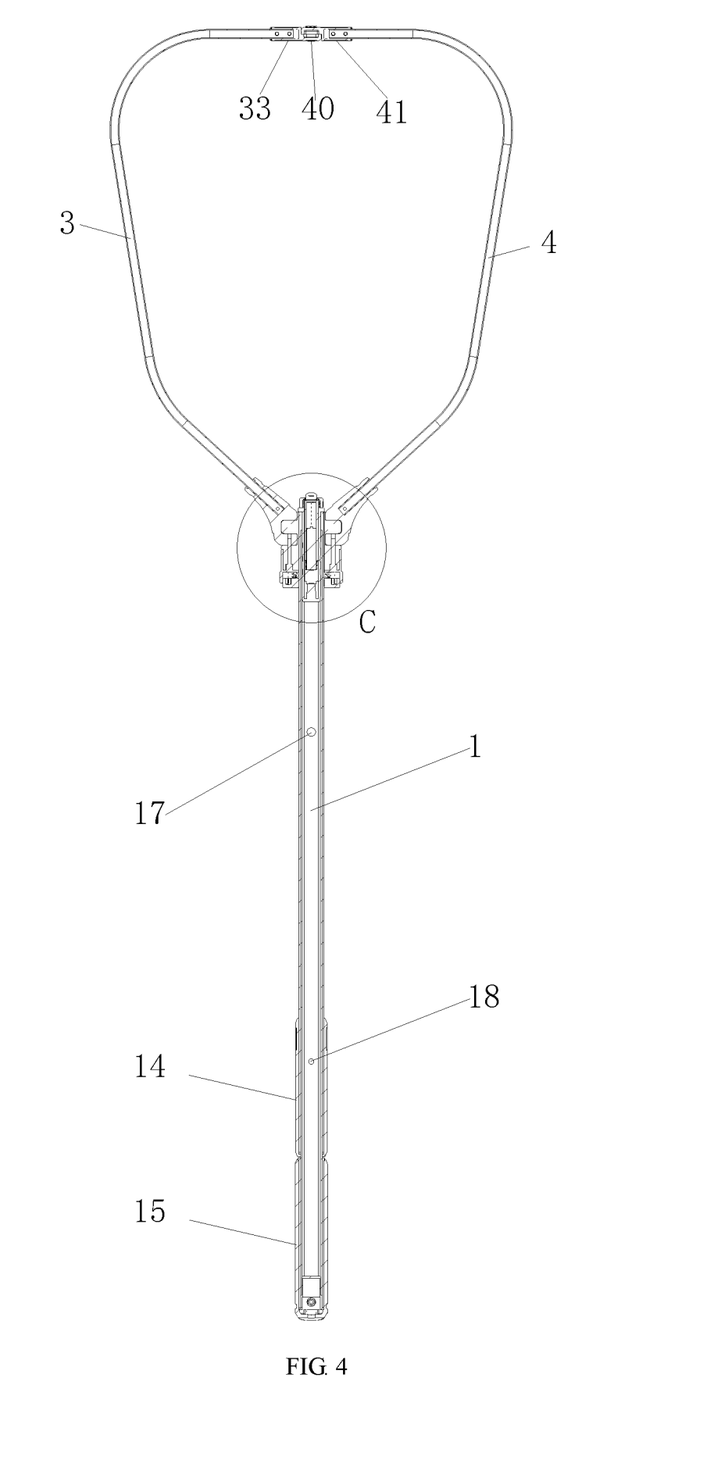
FIG. 4 is a sectional view of the dip net provided with the lockable hoops capable of being folded leftwards and rightwards along A-A in FIG. 3.
Figure 5:
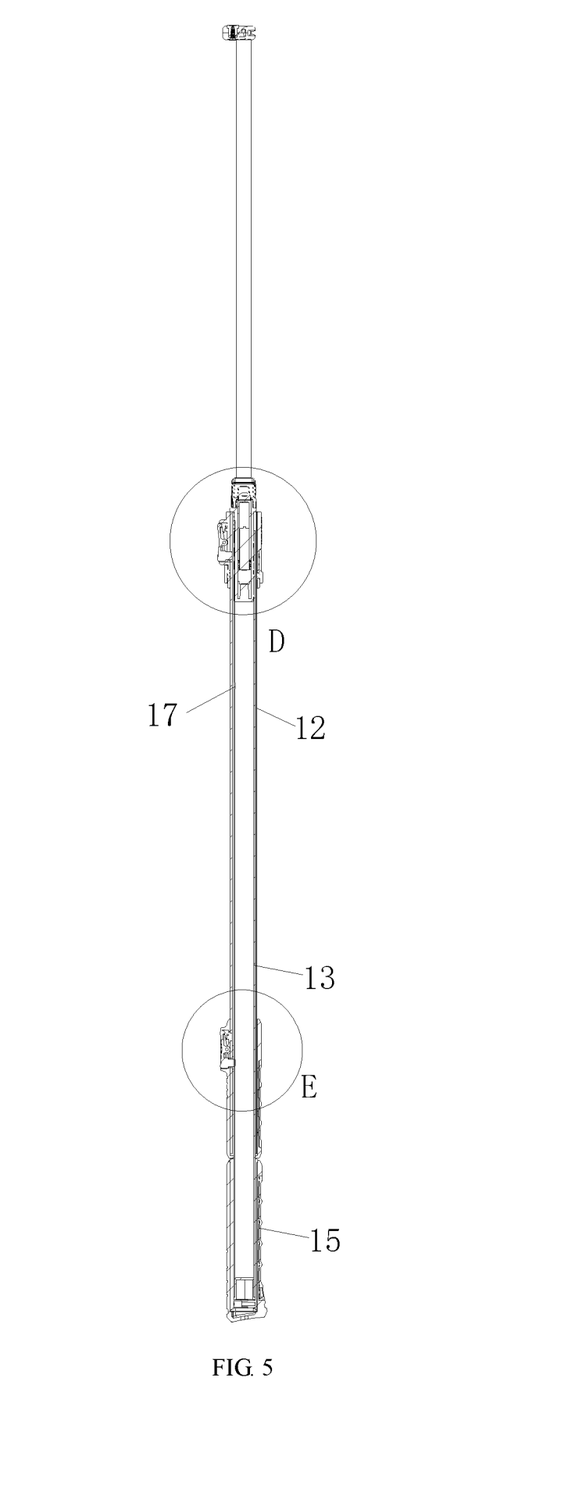
FIG. 5 is a sectional view of the dip net provided with the lockable hoops capable of being folded leftwards and rightwards along B-B in FIG. 2.
Figure 6:
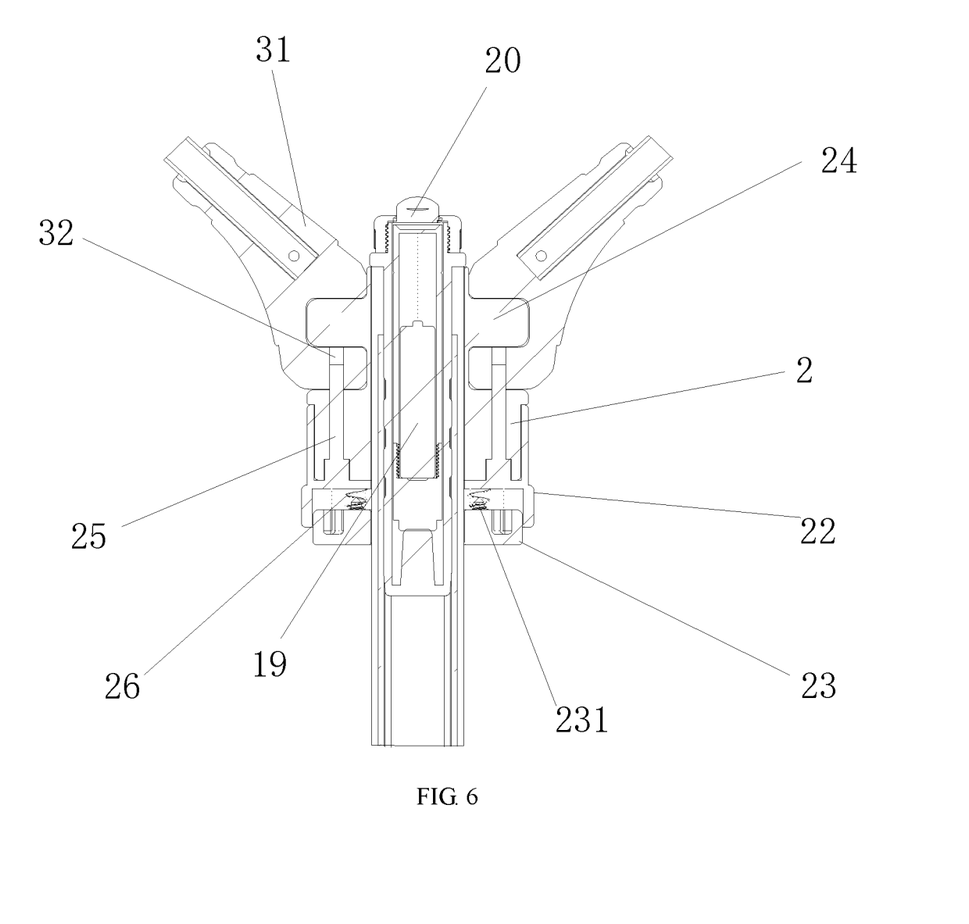
FIG. 6 is an enlarged view of joint C, shown in FIG. 4, of the dip net provided with the lockable hoops capable of being folded leftwards and rightwards.
Figure 7:
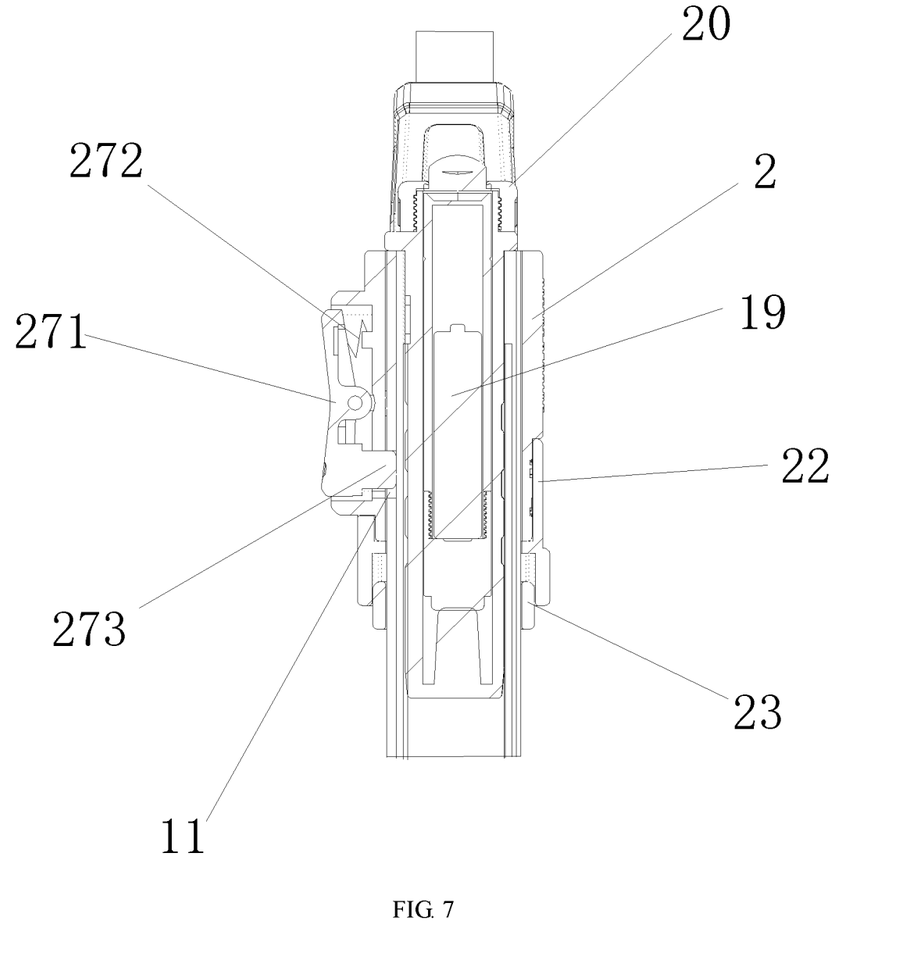
FIG. 7 is an enlarged view of joint D, shown in FIG. 5, of the dip net provided with the lockable hoops capable of being folded leftwards and rightwards.
Figure 8:
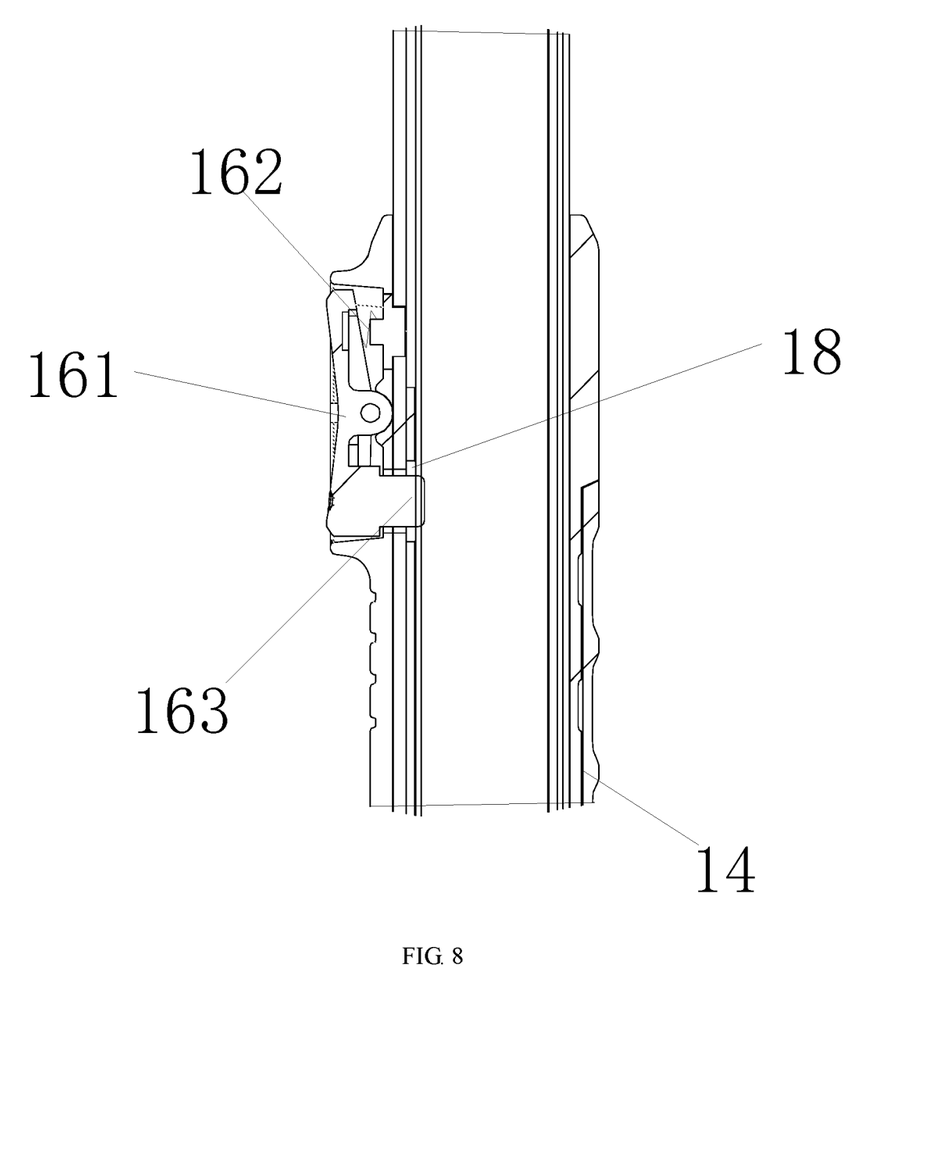
FIG. 8 is an enlarged view of joint E, shown in FIG. 5, of the dip net provided with the lockable hoops capable of being folded leftwards and rightwards.
Figure 9:
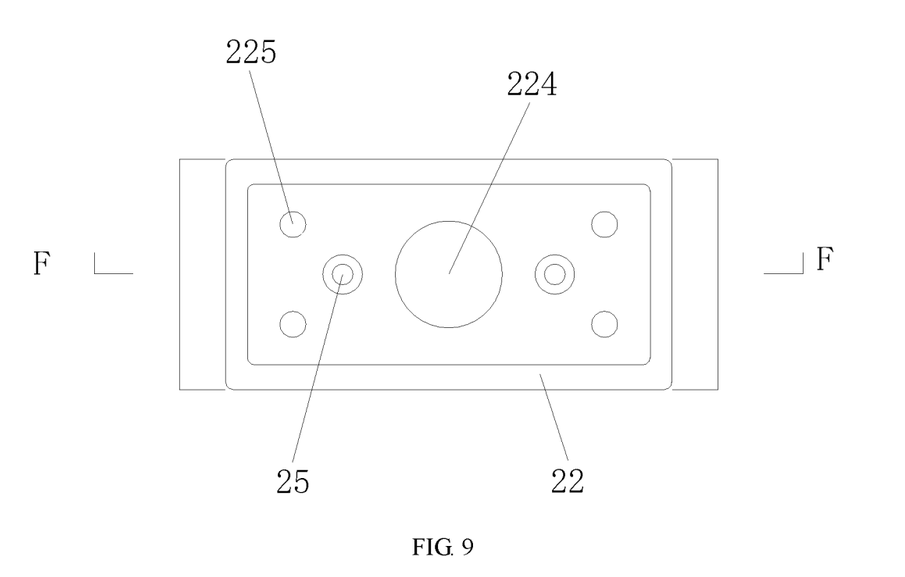
FIG. 9 is a structure view of a lock piece.
Figure 10:
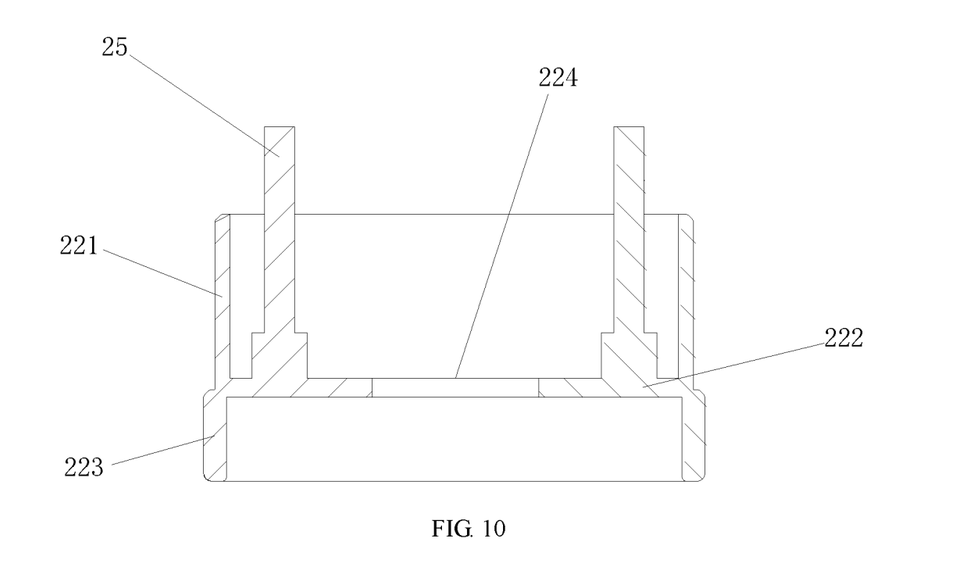
FIG. 10 is a sectional view of the lock piece along F-F in FIG. 9.

As shown in FIG. 4 and FIG. 6, mounting plates 24 are arranged on the left side and the right side of the hoop mounting base 2. The lock device comprises a lock piece 22, a stop block 23, springs 26 and pins 25, wherein the stop block 23 is fixed to the rear side of the hoop mounting base 2, and a sliding area is formed between the stop block 23 and the hoop mounting base 2. As shown in FIG. 9 and FIG. 10, the lock piece 22 comprises a front lantern ring 221, a rear lantern ring 223 and an intermediate barrier plate 222, wherein the intermediate barrier plate 222 is provided with a net rod hole 224 and a screw rod hole 225, and the net rod 1 penetrates through the net rod hole 224, and a screw rod used for fixing the stop block 23 and the hoop mounting base 2 penetrates through the screw rod hole 225. When assembled, the front lantern ring 221 is disposed around the hoop mounting base 2, the rear lantern ring 223 is disposed around the stop block 23, and the intermediate barrier plate 222 is located in the sliding area, so that the lock piece 22 and the hoop mounting base 2 are slidably connected; the pins 25 are arranged on the front side of the lock piece 22, spring limit screws 231 are arranged on the front side of the stop block 23, a plurality of springs 26 having an inner diameter matched with the diameter of the spring limit screws 231 are arranged in the sliding area, and the rear half portions of the springs 26 are disposed around the spring limit screws 231, so that the springs 26 are prevented from skewing; and the front ends of the springs 26 are in close contact with the rear side face of the intermediate barrier plate 222 of the lock piece 22, and the rear ends of the springs 26 are in close contact with the front side face of the stop block 23.

As shown in FIGS. 1-7, rotary bases 31 are arranged at the rear end of the left hoop 3 and the rear end of the right hoop 4, and the two rotary bases 31 are hinged to the mounting plates 24 on the two sides through rotary shafts; pin holes 32 are formed in the rear sides of the rotary bases 31, correspond to the pins 25 in position and are staggered with the rotary shafts, and the pin holes 32 are matched with the corresponding pins 25; and a first connecting plate 33 and a second connecting plate 41 are respectively arranged at the front end of the left hoop 3 and the front end of the right hoop 4 and are hinged together through a rotary pin 40.

When the dip net provided with the lockable hoops capable of being folded leftwards and rightwards is used, the length of the net rod 1 can be adjusted according to the distance to fish to be scooped. When the dip net is used for scooping fish nearby, the second protrusion 163 is matched with the third lock hole 18. When the dip net is used for scooping fish from a distance, the net rod 1 is stretched in the following way: the front half portion of the second lock catch 161 is pressed, while the rear half portion of the second lock catch 161 tilts upwards; the second protrusion 163 disengages from the third lock hole 18, then the rear net rod part 13 is pulled out, and the second lock catch 161 is released; and when the second lock hole 17 coincides with the second protrusion 163 in position while the rear net rod part 13 is pulled out, the second reset spring 162 applies a force to the second lock catch 161, and then the second protrusion 163 is locked in the second lock hole 17.

Figure 11:
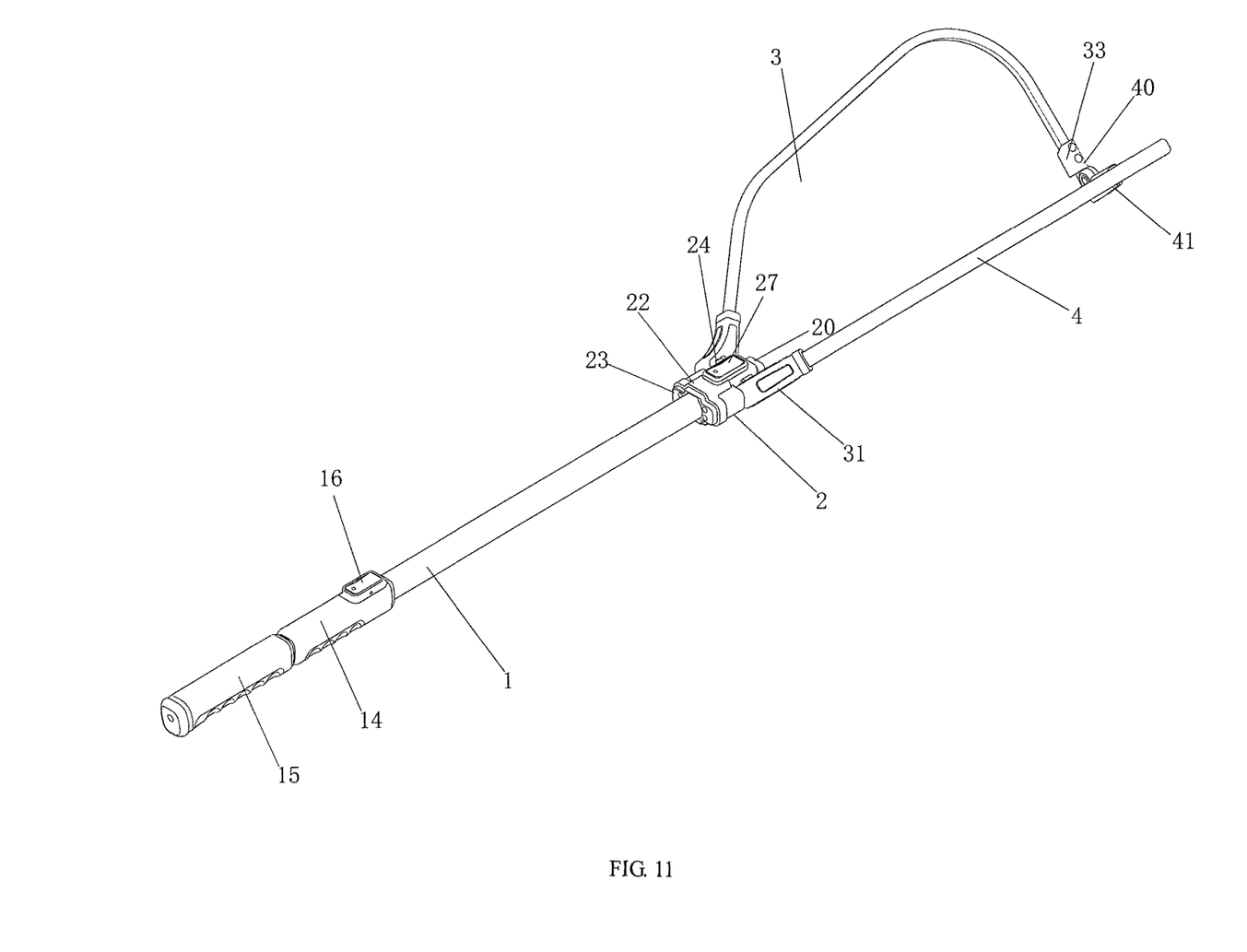
FIG. 11 is a schematic diagram of the folding process of the left and right hoops of the dip net provided with the lockable hoops capable of being folded leftwards and rightwards.
Figure 12:
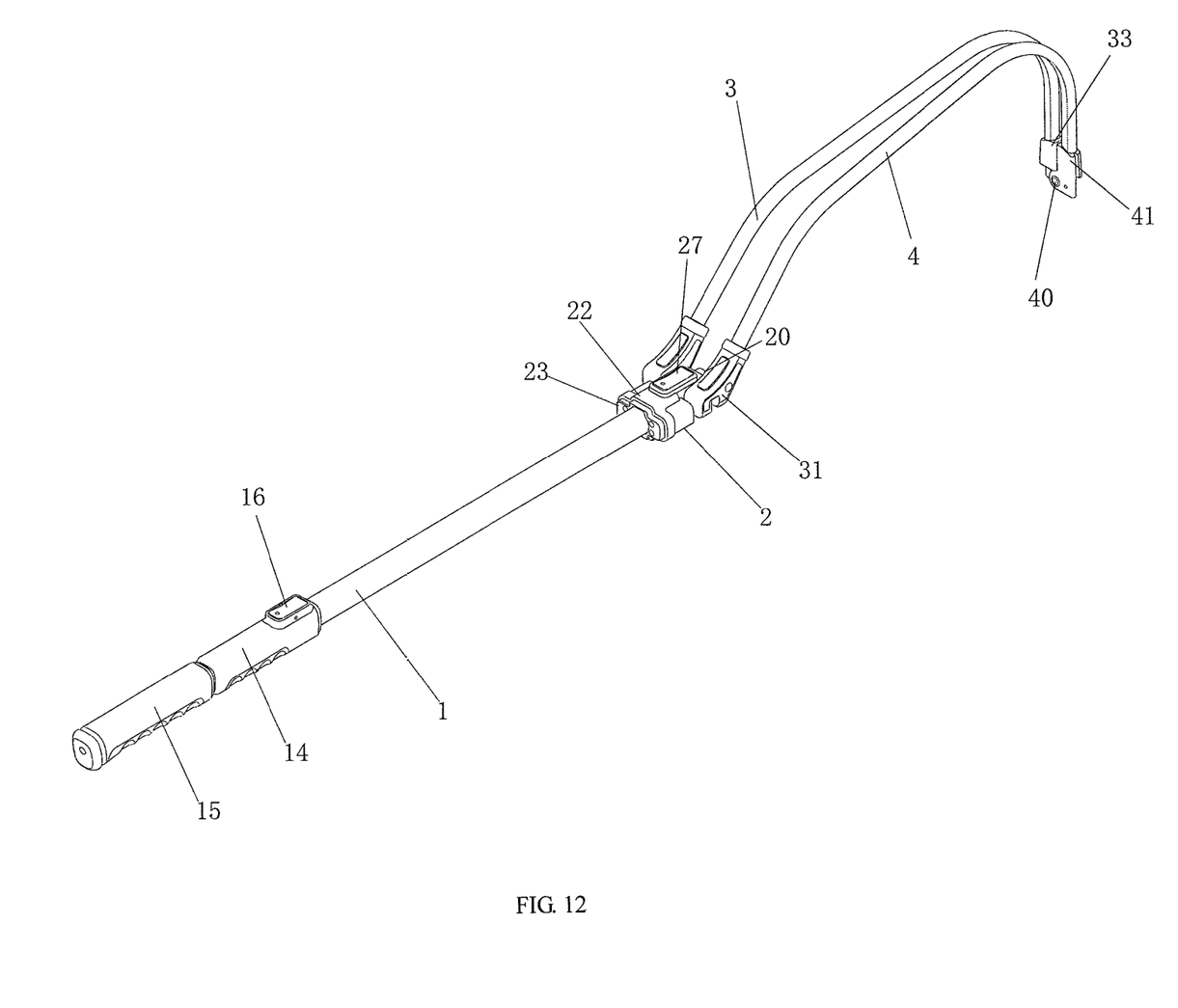
FIG. 12 is a schematic diagram of the left and right hoops in a fully-folded state.
Figure 13:
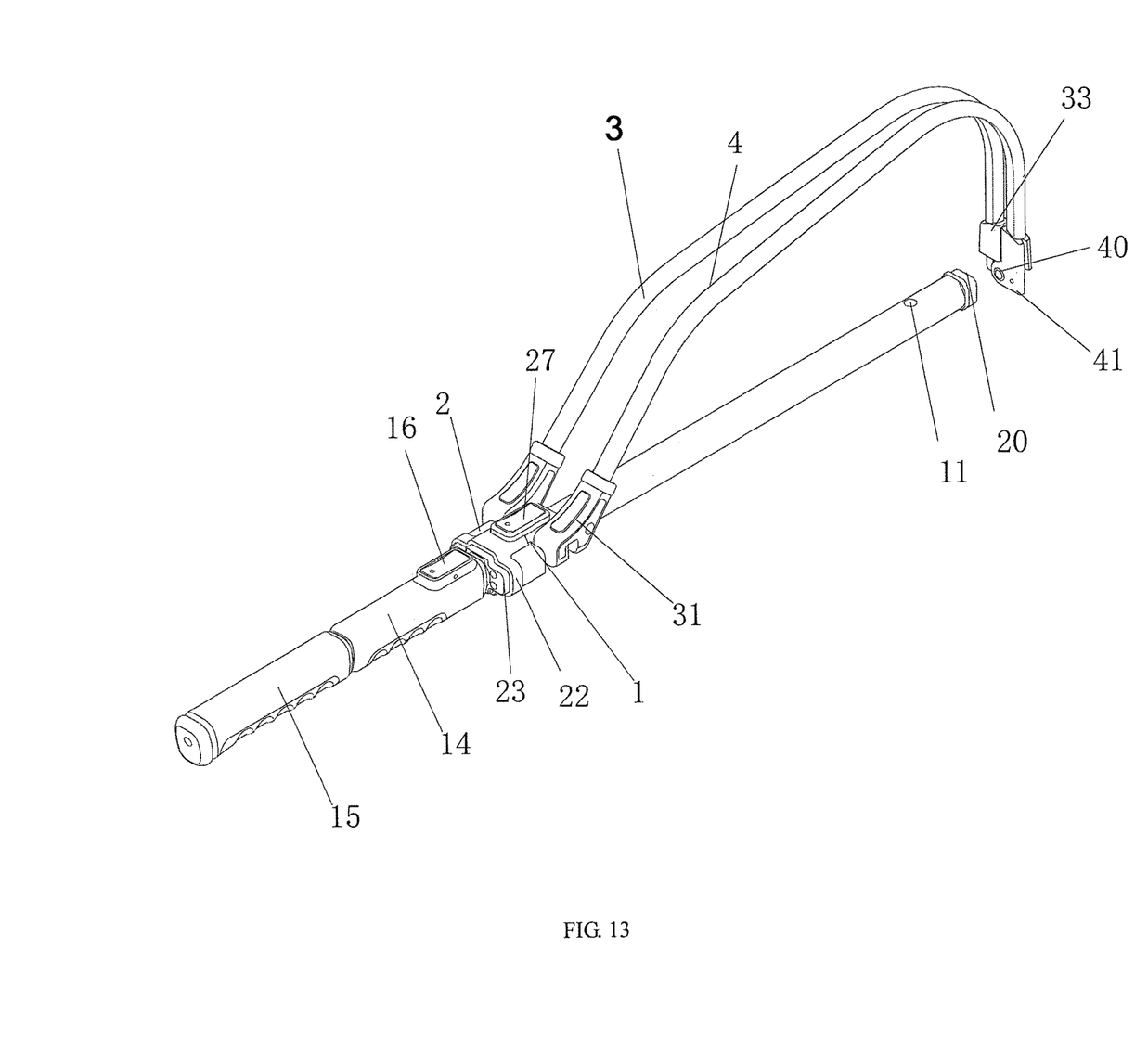
FIG. 13 is a schematic diagram of the dip net with the left and right hoops in the fully-folded state and a net rod in a contracted state.

As shown in FIG. 11, after fishing, the lock piece 22 is pulled backwards with hands, so that the pins 25 disengage from the pin holes 32 to release the rotary bases 31, and the left hoop 3 and the right hoop 4 are folded to form the structure shown in FIG. 12; and then, the front half portion of the first lock catch 271 is pressed, and the first reset spring 272 is compressed, so that the rear half portion of the first lock catch 271 tilts upwards, the first protrusion 273 disengages from the first lock hole 11, and then the net rod 1 is pushed forwards to enter the area defined by the left hoop 3 and the right hoop 4, so that the structure shown in FIG. 13 is formed. In this way, the length of the dip net is greatly decreased, the width of the dip net is decreased by half, and thus, the dip net can be transported or stored more conveniently.

When the dip net provided with the lockable hoops capable of being folded leftwards and rightwards is used again, the net rod 1 is pulled out; when the first lock hole 11 coincides with the first protrusion 273 in position, the first reset spring 272 applies a force to the front half portion of the first lock catch 271, the first lock catch 271 rotates, and the first protrusion 273 is inserted into the first lock hole 11, so that the net rod 1 is locked by the first lock mechanism 27 and is retrained from moving forwards or backwards; afterwards, the left hoop 3 and the right hoop 4 are pulled to rotate, when the pins 25 coincide with the pin holes 32 in position, the springs 26 apply a force to the lock piece 21 to make the lock piece 21 slide forwards, so that the pins 25 are inserted into the pin holes 32; and at this moment, the axes of the pins 25 are staggered with the axes of the rotary shafts, so that the left hoop 3 and the right hoop 4 cannot rotate, and the dip net is kept in the usage state.

The present invention is expounded above with reference to the embodiments, but these embodiments are only preferred ones of the invention and are not intended to limit the implementation scope of the invention. All equivalent variations and improvements achieved within the application scope of the invention should also under the coverage of the invention.

What is claimed is:

1. A dip net provided with lockable hoops capable of being folded leftwards and rightwards, comprising a net rod, a hoop mounting base and hoops, wherein the hoops include a left hoop and a right hoop, the hoop mounting base is mounted on the net rod, and mounting plates are arranged on a left side and a right side of the hoop mounting base; rotary bases are arranged at a rear end of the left hoop and a rear end of the right hoop, and the rotary bases are respectively hinged to the mounting plates on the left and right sides through rotary shafts; a first connecting plate and a second connecting plate are respectively arranged at a front end of the left hoop and a front end of the right hoop and are hinged together; and a lock device is arranged on the hoop mounting base and is used for locking the left hoop and the right hoop on the hoop mounting base when the left hoop and the right hoop are rotated to a same plane; wherein the lock device comprises a lock piece, a stop block, springs and pins; the stop block is fixed to a rear side of the hoop mounting base, a sliding area is formed between the stop block and the hoop mounting base, the lock piece is mounted in the sliding area and is slidably connected with the hoop mounting base, the pins are fixed to a front end of the lock piece, the springs are mounted in front of the stop block, front ends of the springs are in close contact with the lock piece, and rear ends of the springs are in close contact with the stop block; and pin holes are formed in rear sides of the rotary bases, and the pin holes are staggered with the rotary shafts and are matched with the corresponding pins.

2. The dip net provided with the lockable hoops capable of being folded leftwards and rightwards according to claim 1, wherein the lock piece comprises a front lantern ring, a rear lantern ring and an intermediate barrier plate, the front lantern ring is disposed around the hoop mounting base, the rear lantern ring is disposed around the stop block, the intermediate barrier plate is located in the sliding area, the front ends of the springs are in close contact with a rear side face of the intermediate barrier plate, the intermediate barrier plate is provided with a net rod hole and a screw rod hole, the stop block is fixed on the hoop mounting base through a screw rod, the screw rod penetrates through the screw rod hole, and the net rod penetrates through the net rod hole.

3. The dip net provided with the lockable hoops capable of being folded leftwards and rightwards according to claim 1, wherein spring limit screws corresponding to the springs are arranged on a front side of the stop block and have a diameter matched with an inner diameter of the springs, and rear half portions of the springs are disposed around the spring limit screws.

4. The dip net provided with the lockable hoops capable of being folded leftwards and rightwards according to claim 1, wherein the hoop mounting base is provided with a through hole and a first lock mechanism; the first lock mechanism comprises a first lock catch hinged to the hoop mounting base, and the first lock catch is provided with a first reset spring and a first protrusion which are respectively located on a front side and a rear side of a first hinge joint; and the net rod penetrates through the through hole, and a first lock hole is formed in a front end of the net rod and is matched with the first protrusion.

5. The dip net provided with the lockable hoops capable of being folded leftwards and rightwards according to claim 4, wherein the net rod comprises a front net rod part and a rear net rod part; a front handheld part is arranged at a rear end of the front net rod part and is provided with a second lock mechanism, the second lock mechanism comprises a second lock catch hinged to the front handheld part, and the second lock catch is provided with a second reset spring and a second protrusion which are respectively located on a front side and a rear side of a second hinge joint; and the rear net rod part has a rear end provided with a rear handheld part, is slidably connected with the front net rod part, and has a front end provided with a second lock hole, a third lock hole is formed in the rear end of the rear net rod part, and the second protrusion is matched with the second lock hole or the third lock hole.

6. The dip net provided with the lockable hoops capable of being folded leftwards and rightwards according to claim 5, wherein a surface of the front handheld part and a surface of the rear handheld part are each provided with a plurality of anti-slip grooves.

7. The dip net provided with the lockable hoops capable of being folded leftwards and rightwards according to claim 1, wherein a cavity is formed in a front portion of the net rod, a flash light is arranged in the cavity, and an elastic touch switch is arranged at a rear end of the flash light and makes contact with a rear end face of the cavity; and a cover plate is arranged at a front end of the net rod and is connected with the net rod in a threaded manner, and a button is arranged at a center of the cover plate and is matched with the flash light.

* * * * *